J. J. B. J. BOÚVY (NICOLAASZOON).
BELT FASTENER.
APPLICATION FILED JULY 25, 1919.

1,430,211.

Patented Sept. 26, 1922.
2 SHEETS—SHEET 1.

Inventor,
Jacobus Johannes Bernardus Josephus Boúvy Nicolaaszoon,
By Glenn S. Noble
Atty.

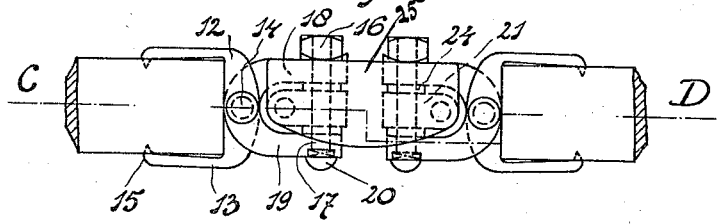
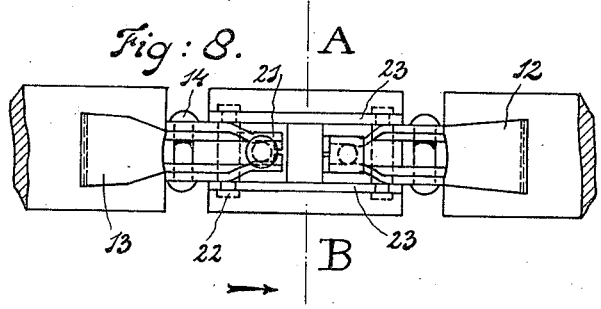
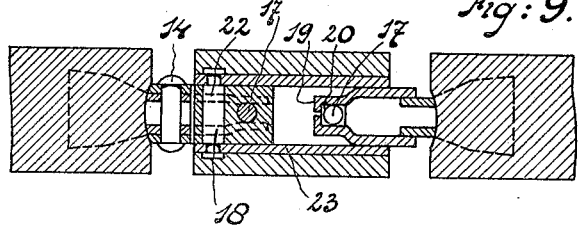
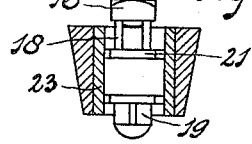

Patented Sept. 26, 1922.

1,430,211

UNITED STATES PATENT OFFICE.

JACOBUS JOHANNES BERNARDUS JOSEPHUS BOÚVY (NICOLAASZOON), OF DORDRECHT, NETHERLANDS.

BELT FASTENER.

Application filed July 25, 1919. Serial No. 313,185.

*To all whom it may concern:*

Be it known that I, JACOBUS JOHANNES BERNARDUS JOSEPHUS BOÚVY (Nicolaaszoon), a subject of the Queen of the Netherlands, residing at Dordrecht, the Netherlands, have invented certain new and useful Improvements in or Relating to Belt Fasteners, of which the following is a specification.

This invention relates to improvements in belt fasteners.

The numerous belt fasteners adopted hitherto have the disadvantage that the connection of the belt ends is effected by means secured to the belt by small bolts which are passed through holes provided for this purpose in the ends of the belt. These holes however, tend to weaken the belt, and it is at these weakened parts that the whole power to be transmitted by the belt comes into play, so that frequent ruptures of the belt occur at these places where the bolts are. As for every new connection it is necessary to cut off a piece of the belt, the belt gets continually shorter so that in the end it becomes useless.

The aforementioned disadvantage is entirely eliminated by the new improved belt fastener, which consists of two pairs of pincers, connected together by a movable connecting piece, the gripping jaws of said pincers engaging the ends of the belt. The width of the gripper arms, i. e., the distance separating the same may be regulated by means of a stretching device.

The holes, which in the belt fasteners adopted hitherto usually had to be made with great accuracy by means of special tools, are avoided in the improved belt fastener as well as the tools used for this purpose, so that a tearing of the belt is consequently obviated.

The improved belt fastener is very simple in construction and can be mounted and removed very rapidly, whereas owing to its greater flexibility it causes much less wear of the belt than is the case with other forms of belt fasteners.

Another feature of the improved belt fastener is that the gripper arms of the pincers are connected by a locking bolt, the grippers being so shaped as to engage fully the ends of the belt, for which purpose they are provided, either only at their ends or over the entire contact surface, with teeth or the like.

According to another form of the improved belt fastener each pair of pincers is composed of two interengaging stampings, the locking bolt being in this form enclosed both at the top as well as the bottom by the free parts of the arms which are bent towards one another.

Figure 1:
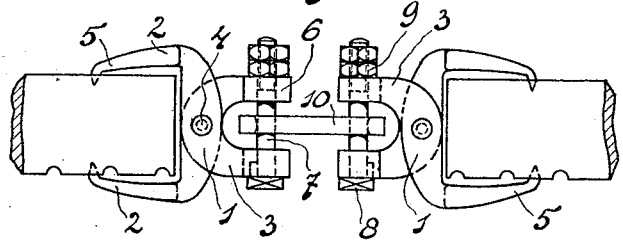
Figure 2:
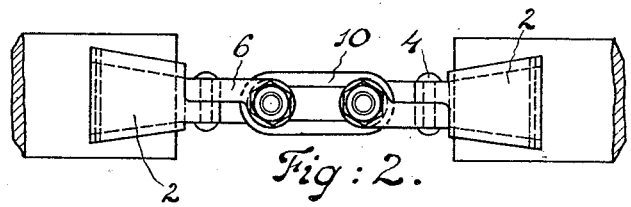
Figure 3:
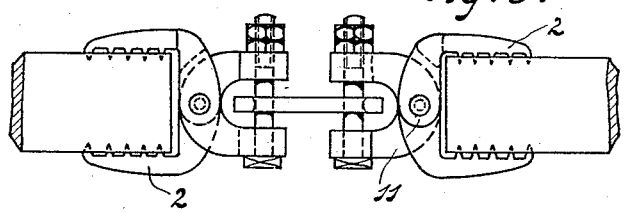
Figure 4:
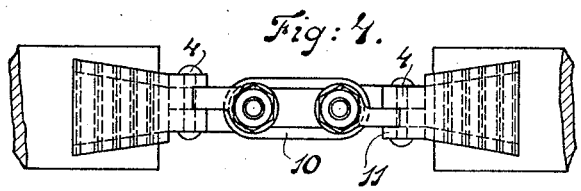
Figure 5:
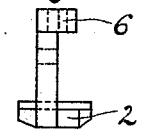
Figure 6:
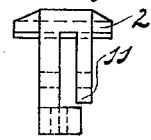

Several forms of carrying this invention into effect are shown by way of example in the accompanying drawings, in which, Fig. 1 is a side elevation of the new belt fastener, Fig. 2 a plan view, Fig. 3 a side elevation of a modified form of the improved belt fastener, Fig. 4 a plan view thereof, Figs. 5 and 6 views of separate details, Fig. 7 a side elevation of a further modified form of the new belt fastener, The left half of Fig. 8 an inverted plan and the right hand half of the same figure an ordinary plan view, Fig. 9 a section along the line C—D in Fig. 7, and Fig. 10 a section on the line A—B in Fig. 8, as seen when looking in the direction of the arrow.

As shown in the drawings the improved belt fastener consists of two identical pairs of pincers 1, each pair comprising two gripping jaws or grippers 2, and two arms 3, which are pivotally mounted in the usual way on a journal 4. Those parts of the said grippers which engage the belt are enlarged and are provided on their ends with sharp knife edges 5 or with teeth. The grippers for the underside of the belt are smaller than those for the upper side thereof.

The extremities of the gripper arms are provided with eyelets 6, through which a bolt 7, can pass, the head 8, of which is provided with suitable means for preventing the bolt from turning, a nut 9 with a lock nut screwing on to the other end of the bolt. Between the two bolts 7 a connecting piece 10, is arranged, which as shown in Fig. 1, takes the form of a shackle.

The fastening of both ends of the belt is now effected in the following manner:—

It is supposed that the connecting piece 10, has already been fixed beforehand between the bolts 7 and further that the nuts 9 and their lock nuts of both pairs of pincers are unscrewed on the bolt 7, to such an extent that the knife edges 5 are moved farther apart than corresponds to the width of the belt. The knife edges are then moved over the ends of the belt until the inner face of the grippers rests against the end of the belt as shown in Fig. 1. The nut 9, and its lock nut are now tightened up so that the knife edges 5 penetrate into the material of the belt. Thus by tightening up or easing the nut 9 and its lock nut the force with which the grippers 2 engage the ends of the belt may be regulated.

In Figs. 3 and 4 another form of carrying this invention into effect is illustrated. In the form shown in Figs. 1 and 2 the connecting piece 10 engages the belt in the middle, but the arms of the grippers are arranged laterally in relation to each other so that consequently the pivots 4 are liable to be strained on bending.

To avoid this disadvantage the journal pin 4 can be supported at two places and the force applied at the centre of the journal. For this purpose the arms of the pincers can be shaped as shown in Figs. 5 and 6. According to Fig. 6 the gripper 2 is further provided with a lateral arm 11 which together with the main arm of the gripper 2 is adapted to take the journal 4. The lowermost gripper is in this case made of such dimensions that it can be placed between the main arm of the gripper 2, and the lateral arm 11 (Fig. 6) for the purpose of forming pincers on which the journal may be riveted.

In the form shown in Figs. 3 and 4 the grippers are provided with several rows of knife edges which also may take the form of teeth.

It is obvious that, instead of knife edges or teeth the inner faces of the grippers can be formed in any other suitable manner provided always that sufficient friction is set up between the grippers and the ends of the belt so as to prevent the belt from slipping off and becoming loose.

In the form shown in Figs. 7, the pincers are composed of two grippers 12 and 13, stamped out from solid metal and bent. They are secured together by means of a small stud 14. The pincer half 13 fits into the pincer half 12 and both are provided with teeth 15 at the points where they engage the belt. The end 18, opposite the belt is fork-shaped (Fig. 9), the upper edge thereof being slightly inclined in a forward direction and adapted to receive a nut 16, which locks a clamping bolt 17, connecting the extremities of the pincers. The end 19 of the member 12 is so shaped that the square part 20 of the bolt 17 is entirely enclosed (see right hand half of Fig. 9).

It therefore appears from the above that the bolt 17, with the exception of its underside, where it is provided with a round head, is secured against turning by the square part 20 and as the nut 16 has a round bearing surface the bolt 17 is prevented from moving out of the fork 18, since the round upwardly inclined edge prevents it therefrom. The extremity of the arm 18 can also be constructed in the same way as the end of the arm 19. Between the arms 18 and 19 a connecting piece 21, is arranged, the said piece being adapted to pivot and move up and down on a stud 22, riveted to two connecting plates 23. The clamping bolt 17 passes through these connecting pieces 21. In order to adjust the distance between the connecting piece 21 and the end of the arms washers 24 made of rubber, leather or resilient steel may be interposed. The form of the connecting plates 23 is clearly shown in Figs. 8 to 10.

As described hereinbefore the pincers are made smaller at one side than at the other.

The fastening device is applied in the following manner:—

First the nuts 16 are fully unscrewed, so that the pincers 12 and 13 are opened to such an extent that the belt can easily move between the teeth 15. After these teeth have assumed their proper position, the nuts 16 are screwed up to such an extent as to cause the teeth 15 to enter the material of the belt, so that on pulling, the belt will be carried along. To undo the fastener the procedure is reversed.

It is obvious, that owing to the crossed centres of rotation the belt fastener is allowed to follow any possible bending movement of the belt and as the connecting plates 23 are provided with a cover 25, the section of which corresponds to the section of the belt, there will be only two narrow gaps in the belt.

Instead of making the connecting piece in the form of a shackle, the ends of the bolts may also be connected by a chain, a hook, a plate or the like. The heads 8 of the bolts 7 also may be screwed in any other way to that shown in Fig. 1 and 3. The locking bolt itself may also be replaced by a suitable stretching device.

What I claim as my invention and desire to secure by Letters Patent is:

1. A belt fastener comprising two pairs of pincers connected together by a movable connecting piece, said pincers having grippers adapted to engage only the outsides of the belt ends, and arms the spacing apart of which can be regulated independent of the belt tension.

2. In a belt fastener, the combination of two articulated gripping members adapted to engage the opposite outer sides only of the belt, and clamping means connecting the other ends of said members and adapted to actuate them independently of the belt tension to grip the ends of the belt.

3. A belt fastener comprising two pairs of pincers connected by a movable connecting piece, each pair of pincers comprising two stampings pivoted together, and the free arm of each pair being forked, and a locking bolt engaging the forked extremity of each pair of pincers and having its shaft enclosed and engaged by the forked extremities of the gripper arms which are bent toward each other for this purpose.

In testimony whereof I have affixed my signature.

JACOBUS JOHANNES BERNARDUS
JOSEPHUS BOÚVY (Nicolaaszoon.)